United States Patent
Carbone et al.

(10) Patent No.: US 10,059,463 B2
(45) Date of Patent: Aug. 28, 2018

(54) SENSOR SYSTEM FOR A WING PANEL ASSEMBLY AND METHOD OF MONITORING A WING PANEL ASSEMBLY

(71) Applicant: Hamilton Sundstrand Corporation, Windsor Locks, CT (US)

(72) Inventors: Michael Carbone, Rockford, IL (US); Scott C. Bonnett, Chicago, IL (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 241 days.

(21) Appl. No.: 14/554,664

(22) Filed: Nov. 26, 2014

(65) Prior Publication Data

US 2016/0229551 A1   Aug. 11, 2016

(51) Int. Cl.
*G01C 21/00* (2006.01)
*B64D 45/00* (2006.01)

(52) U.S. Cl.
CPC .... *B64D 45/0005* (2013.01); *B64D 2045/001* (2013.01)

(58) Field of Classification Search
None
See application file for complete search history.

(56) References Cited

U.S. PATENT DOCUMENTS

| | | | | |
|---|---|---|---|---|
| 6,483,436 | B1 * | 11/2002 | Emaci | B64D 45/0005 244/194 |
| 6,879,240 | B2 * | 4/2005 | Kruse | B60G 7/005 338/12 |
| 2004/0245386 | A1 * | 12/2004 | Huynh | B64C 9/16 244/99.5 |
| 2009/0136288 | A1 * | 5/2009 | Ersoy | B60D 1/30 403/76 |
| 2009/0152064 | A1 * | 6/2009 | Versluis | B64C 9/04 188/371 |
| 2014/0137659 | A1 | 5/2014 | Carbone | |
| 2015/0251697 | A1 * | 9/2015 | Lavoie | B62D 13/06 701/523 |

FOREIGN PATENT DOCUMENTS

| | | |
|---|---|---|
| EP | 2368794 A2 | 9/2011 |
| GB | 2323577 A | 9/1998 |

OTHER PUBLICATIONS

Extended European Search Report of the European Patent Office for International Application No. EP15196465.7, dated Apr. 5, 2016, 7 pages.

* cited by examiner

*Primary Examiner* — Brian Zimmerman
*Assistant Examiner* — Kevin Lau
(74) *Attorney, Agent, or Firm* — Cantor Colburn LLP

(57) ABSTRACT

A sensor system for a wing panel assembly of an aircraft includes a first end of a linkage assembly operatively coupled to a first slat panel. Also included is a second end of the linkage assembly operatively coupled to a second slat panel with a first ball joint. Further included is a block having a cutout portion surrounding the first ball joint. Yet further included is a sensing element disposed proximate the block to detect rotation of the block beyond a predetermined angle.

6 Claims, 4 Drawing Sheets

SENSOR SYSTEM FOR A WING PANEL ASSEMBLY AND METHOD OF MONITORING A WING PANEL ASSEMBLY

BACKGROUND OF THE INVENTION

The subject matter disclosed herein relates to aircrafts and, more particularly, to a sensor system for a wing panel assembly of an aircraft, as well as a method of monitoring a wing panel assembly.

High lift systems involve multiple wing panels which move in synchronous motion. Inter-slat sensors are required to detect a disconnect condition which could allow panels to become skewed. The sensors must allow some motion to accommodate normal motion attributed to tolerances, thermals, deflections, and deployment, while still detecting the disconnect condition at safe levels. Commonly, sensor arms, a conductive fuse, and a striker pin on an opposing panel are employed. The sensor arms must be long enough to remain engaged with the pin during normal motion, but yet not interfere with structure during detection. Interferences are common if the normal motions of the slat panels are significant.

BRIEF DESCRIPTION OF THE INVENTION

According to one aspect of the invention, a sensor system for a wing panel assembly of an aircraft includes a first end of a linkage assembly operatively coupled to a first slat panel. Also included is a second end of the linkage assembly operatively coupled to a second slat panel with a first ball joint. Further included is a block having a cutout portion surrounding the first ball joint. Yet further included is a sensing element disposed proximate the block to detect rotation of the block beyond a predetermined angle.

According to another aspect of the invention, a method of monitoring a wing panel assembly of an aircraft is provided. The method includes allowing a predetermined angle of rotation of a linkage assembly operatively coupled to a first slat panel at a first end and operatively coupled to a second slat panel at a second end, wherein coupling at the first and second end is made with respective ball joints. The method also includes contacting a sidewall of a cutout portion of a block with the linkage assembly to rotate the block. The method further includes transmitting forces associated with rotation of the block to a sensing element. The method yet further includes detecting a wing panel error with an aircraft system in communication with the sensing element.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Referring to FIGS. 1-4, a sensor system 10 for a wing panel assembly of an aircraft is illustrated. The wing panel assembly includes a plurality of wing panels that are located proximate a leading edge of a wing of the aircraft. The wing panels are actuated to different positions based on an operating condition of the aircraft. In particular, the wing panels are in a first position to provide a high lift coefficient to facilitate a lift force on the aircraft during takeoff Shortly after becoming airborne, the wing panels are retracted to a second position to reduce drag forces on the wing, as the additional lift forces are no longer required. The wing panels are configured to move synchronously in a connected manner. It is advantageous to monitor that the connected relationship of the wing panels is maintained. To achieve this, the sensor system 10 described herein is employed.

Figure 2:
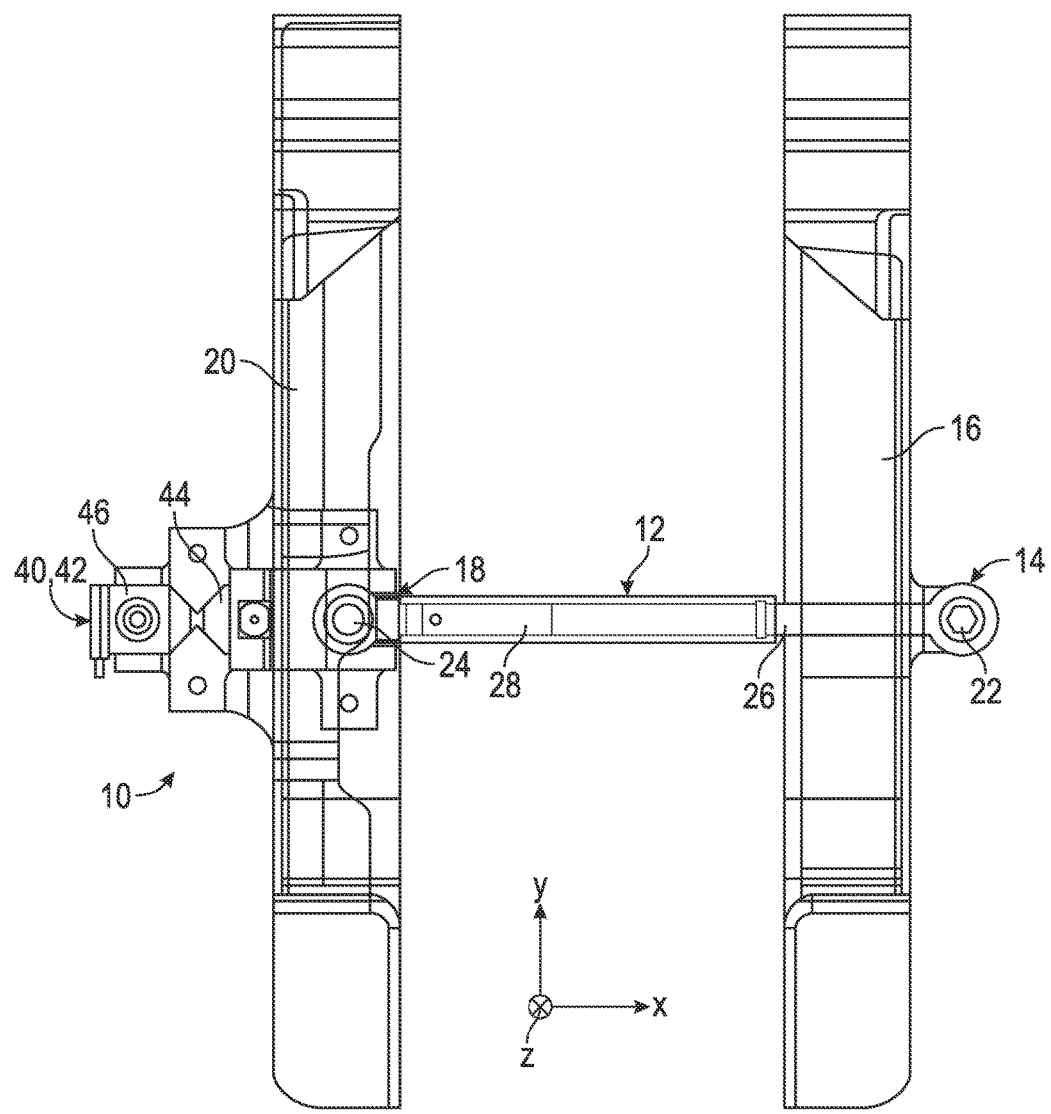
FIG. 2 is a top view of the sensor system operatively coupled to a first slat panel and a second slat panel.
Figure 3:
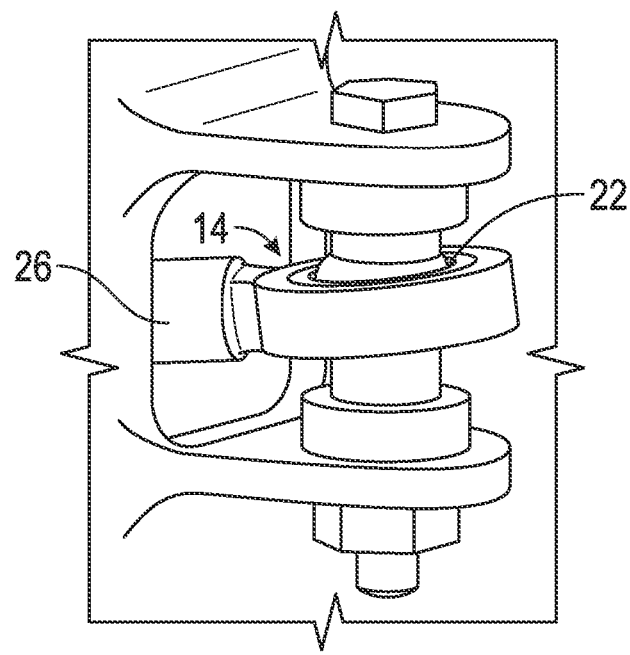
FIG. 3 is a perspective view of a first end of a linkage assembly of the sensor system operatively coupled to the first slat panel.

As shown in FIG. 2, the sensory assembly 10 includes a linkage assembly 12 operatively coupled at a first end 14 to a first slat panel 16 and at a second end 18 to a second slat panel 20. It is to be understood that only two slat panels are illustrated for purposes of discussion, but it is to be appreciated that more panels are typically included in the overall wing panel assembly. The operative coupling of the first end 14 of the linkage assembly 12 to the first slat panel 16 is made with ball joint 22. Similarly, a ball joint 24 is employed to operatively couple the second end 18 of the linkage assembly 12 to the second slat panel 20.

Figure 1:
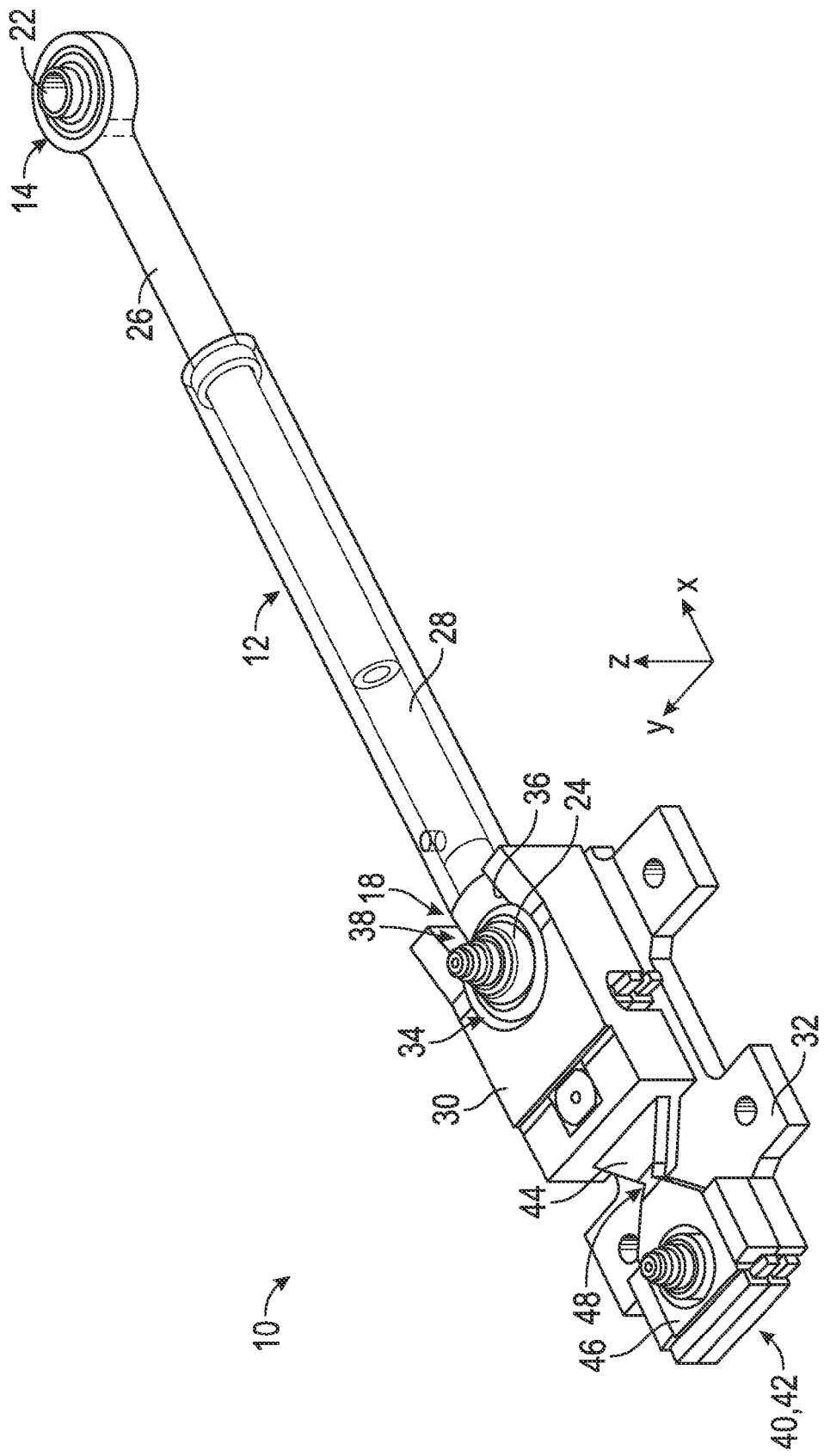
FIG. 1 is a perspective view of a sensor system for a wing panel assembly of an aircraft.
Figure 4:
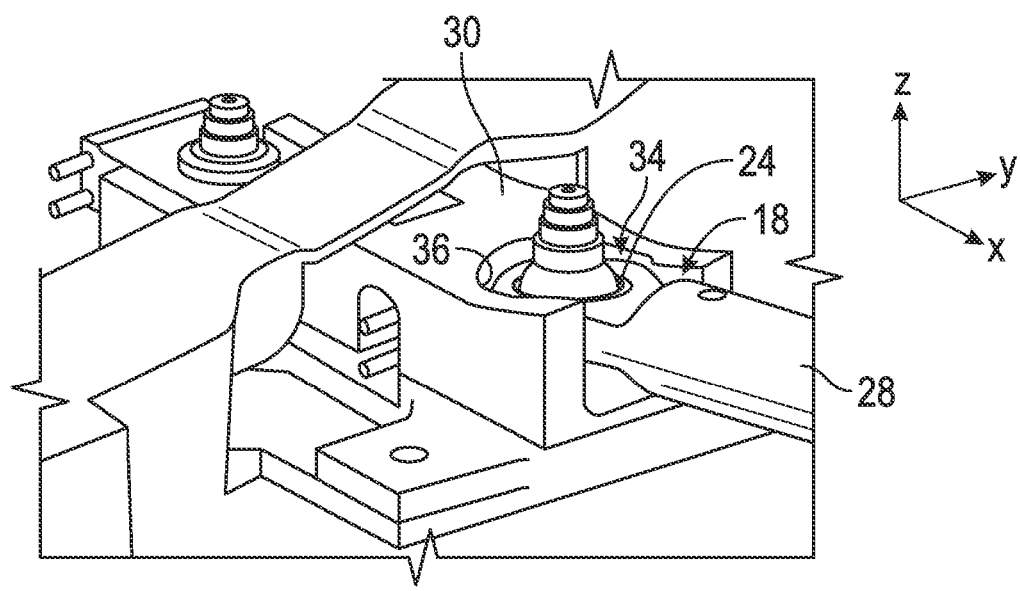
FIG. 4 is a perspective view of a second end of the linkage assembly of the sensor system operatively coupled to the second slat panel.

The ball joints 22, 24 allow for rotation in all degrees of freedom, which may be referenced with the coordinate system shown in FIGS. 1, 2 and 4. The coordinate system includes an x-, y-, and z-axes, which are referred to herein. The ball joints 22, 24 accommodate natural movements of the slat panels 16, 20, which may occur due to various factors. For example, movements in the x-direction are often attributed to thermal conditions of the wing, while motions in the z-direction are often driven by wing deflection. Some motion in the y-direction must be allowed due to tolerance, but too much motion in this direction must be monitored closely, as rotation past a predetermined angle is indicative of disconnection of the slat panels. All of the aforementioned motions must be accommodated by the sensor system 10, but not detected to avoid false alarms of disconnect. Motion in the x- and z-directions may be tolerated to a greater extent than the y-direction.

The linkage assembly 12 includes a first arm 26 that is in telescoping engagement with a second arm 28. This arrangement accommodates movement in the x-direction, while the ball joint accommodates movement in the y- and z-directions. Repeated and sealed telescoping engagement of the first arm 26 and the second arm 28 may be achieved with numerous contemplated arrangements. For example, a sliding piston may be employed therein, a bellows portion may surround a portion of the first and second arm 26, 28, and/or axial grooves filled with grease may be employed to provide the desired telescoping characteristics.

Figure 5:
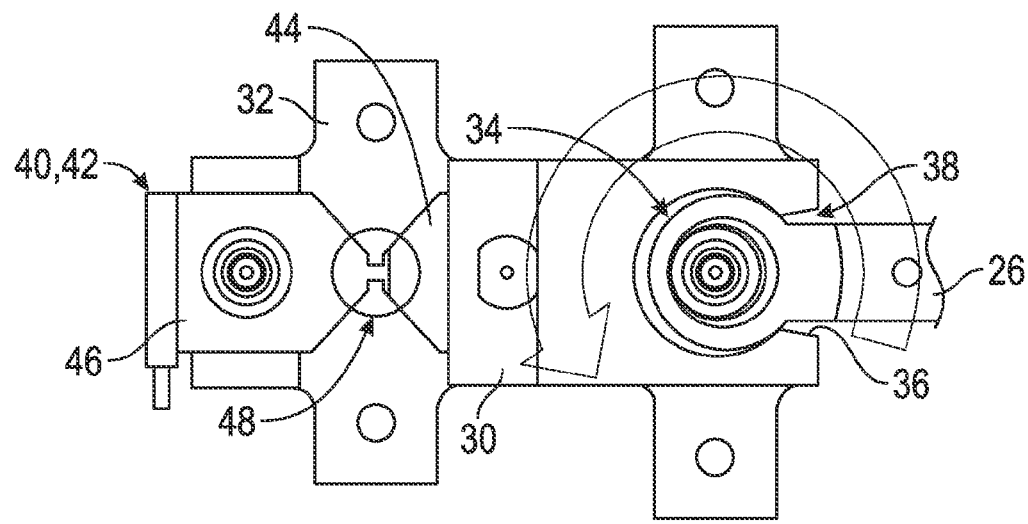
FIG. 5 is a top view of a sensing element of the sensor system according to a first embodiment.

Referring to FIG. 5, with continued reference to FIGS. 1-4, the sensor system is illustrated according to a first embodiment. The ball joint 28 that couples the second end 18 of the linkage assembly 12 to the second slat panel 20 is at least partially surrounded by a block 30. The block 30 is coupled to a housing 32 and is rotatable as a turntable. The housing is coupled to the second panel 20. The block 30 includes a cutout portion 34 defined by at least one sidewall 36. A slight gap 38 is defined by the at least one sidewall 36 and the second end 18 of the linkage assembly 12. The gap 38 provides a predetermined degree of rotation of the linkage assembly 12 due to y-direction motion to account for the issues described above. Upon rotation of the linkage assembly 12 beyond the predetermined degree of rotation due to y-direction motion, contact is made between the linkage assembly 12 and the sidewall 36. Further rotation imparts rotation of the block 30.

A sensing element 40 is operatively coupled to the housing 32, such as with at least one mechanical fastener. The sensing element 40 of the illustrated embodiment of FIG. 5 is a fuse assembly 42 having a first fuse segment 44 and a second fuse segment 46. The block 30 is operatively coupled to the first fuse segment 44 in a fixed manner such that rotation of the block 30 causes corresponding rotation of the first fuse segment 44. The first fuse segment 44 and the second fuse segment 46 are formed as a single component, with a necked region 48 coupling the two segments together. When the rotation of the linkage assembly 12 imparts a sufficient force on the block 30 and therefore the first fuse segment 44, a decoupling of the first fuse segment 44 and the second fuse segment 46 occurs. Decoupling occurs due to a shearing force at the necked region 48. The embodiments described herein rely on a shearing force to make the decoupling of the segments 44, 46. A lower shear load is required to break the segments 44, 46 in comparison to sensor assemblies that require an axial or tensile load, thereby increasing the sensitivity of the sensor system 10.

The fuse assembly 42 is a conductive fuse that is in communication with a circuit that is configured to open or close upon decoupling of the fuse segment 44, 46. An open (or closed) circuit alerts an aircraft system of a wing panel assembly error condition.

Figure 6:
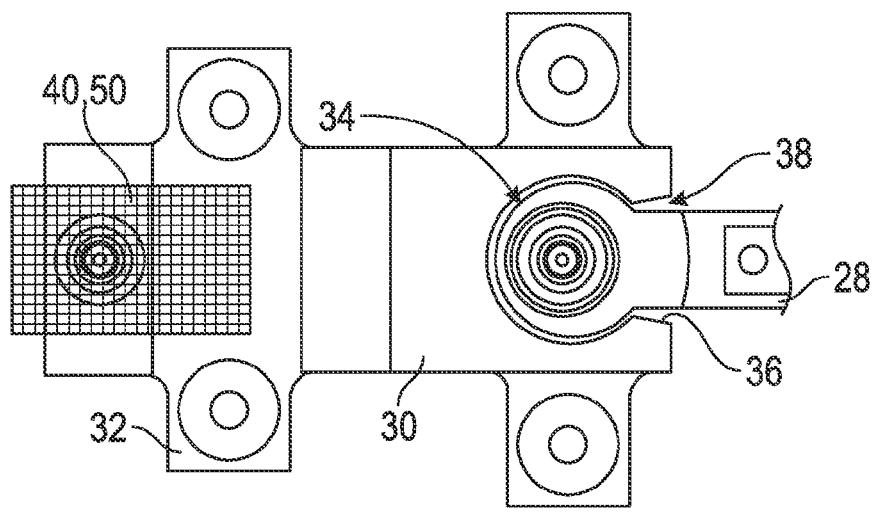
FIG. 6 is a top view of the sensing element according to a second embodiment.

Referring now to FIG. 6, with continued reference to the preceding figures, a second embodiment of the sensing element 40 is generally illustrated. The sensing element 40 in the illustrated embodiment comprises a proximity sensor 50 that is configured to detect proximity of the block 30 to the sensor 50. Upon reaching a predetermined proximity, a circuit is modified to provide the alert to the aircraft system, as described above in relation to the first embodiment of the sensing element 40. The proximity sensor 50 may include a magnet in some embodiments to facilitate engagement of the sensor 50 and the block 30 with magnetic attraction upon reaching the predetermined proximity. In particular, modification of the circuit to an open (or closed) state alerts the aircraft system of the wing panel assembly error condition and corrective action may be taken.

Advantageously, the embodiments of the sensor system 10 described herein accommodate motions that are normal during operation, while avoiding interferences with sensor system components, such as contact arms.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A sensor system for a wing panel assembly of an aircraft comprising:
    a first end of a linkage assembly operatively coupled to a first slat panel;
    a second end of the linkage assembly operatively coupled to a second slat panel with a first ball joint;
    a block having a cutout portion surrounding the first ball joint, the cutout portion of the block defined by a sidewall, at least a portion of the sidewall spaced from the linkage assembly to accommodate a predetermined amount of movement of the linkage assembly, the block rotatable upon contact between the linkage assembly and the sidewall; and
    a sensing element disposed proximate the block to detect rotation of the block beyond a predetermined angle, wherein the sensing element comprises a fuse assembly having a first fuse segment and a second fuse segment coupled to each other with a necked region, the block operatively coupled to the first fuse segment in a fixed manner and rotation of the block beyond the predetermined angle decoupling the first fuse segment and the second fuse segment.

2. The sensor system of claim 1, wherein decoupling of the first fuse segment and the second fuse segment modifies a circuit to alert an aircraft system of a wing panel assembly error.

3. The sensor system of claim 1, wherein the first end of the linkage assembly is operatively coupled to the first slat panel with second ball joint.

4. The sensor system of claim 1, wherein the linkage assembly comprises a telescoping arm.

5. The sensor system of claim 1, wherein the sensing element is mechanically fastened to a housing.

6. A method of monitoring a wing panel assembly of an aircraft comprising:
    allowing a predetermined angle of rotation of a linkage assembly operatively coupled to a first slat panel at a first end and operatively coupled to a second slat panel at a second end, wherein coupling at the first and second end is made with respective ball joints;
    contacting a sidewall of a cutout portion of a block with the linkage assembly to rotate the block;
    transmitting forces associated with rotation of the block to a sensing element, the sensing element comprising a fuse assembly having a first fuse segment and a second fuse segment coupled to each other with a necked region, the block operatively coupled to the first fuse segment in a fixed manner and rotation of the block beyond the predetermined angle decoupling the first fuse segment and the second fuse segment; and
    detecting a wing panel error with an aircraft system in communication with the sensing element.

* * * * *